Patented Dec. 29, 1931

1,839,159

UNITED STATES PATENT OFFICE

ROBERT L. NEWBERN, OF PALESTINE, TEXAS

LUBRICATING COMPOUND

No Drawing.    Application filed November 8, 1930. Serial No. 494,444.

This invention relates generally to lubricating compounds, and particularly to a compound or composition which will serve extraordinarily well the requirements of a lubricant for use on the cylinder walls and pistons of a steam locomotive, but which may find a general use in all types of engines and machines which require a lubricant which will stand up at temperatures ranging to 450 degrees Fahrenheit, and which will not break down and lose efficiency in hard service at such temperatures.

It is an object of this invention to produce a lubricating compound or composition which will materially reduce the wear on cylinder walls, piston rings and other moving parts subject to friction and high temperatures, which will obviate the frequent replacement of gaskets, and which will aid in filling score marks and minor abrasions in cylinder walls and lengthen the life of the cylinder walls and the pistons and the piston rings as well as the associated mechanism.

It is also an object of this invention to provide a lubricating compound or composition which by its action and constitution will reduce the necessity of frequent replacing of the valve and cylinder packings, will aid in the production and retention of high compression by filling up apertures which commonly are present to permit the escape of steam under pressure and the like high compression conditions, whereby a greater efficiency of operation of the machine is achieved along with a saving of fuel and water, and a consequent reduction in the cost of operation and the necessity for repairs.

These and other objects of the invention, its nature and its composition, combination and mixture of elements and ingredients, will be readily understood by anyone acquainted with the art to which this invention relates upon consulting the following description.

My improved lubricating compound or composition is composed of the following elements:—

First—I employ flake graphite, which is a lubricant in its own right, and which has the effect of producing a smooth surface upon the cylinder walls, and which also aids in holding the other constituents of my lubricating compound or composition to the surfaces exposed to frictional wear.

Secondly—ammonia, which is employed for its facility in "cutting" gum accumulations which tend to form on surfaces exposed to wear, and the addition of ammonia to my composition or compound has the further effect of preserving the chemical neutrality of the same or it may render the same slightly alkaline.

Thirdly—I employ powdered zinc, to fill score marks in the cylinder walls or in other frictional bearing surfaces, the zinc being softer than iron or steel.

Fourthly—I employ white lead which functions similarly to the zinc and aids in filling scored places in the walls of the cylinder and other surfaces, and it has the additional effect of filling any small openings or apertures through which the escape of steam or compression is taking place. It should be noted that at extreme temperatures white lead may undergo a chemical reduction, but this will in no way impair its usefulness as an element in my lubricating compound or composition.

Fifthly—I employ sulphur, which material is believed to combine chemically with certain other constituents of the lubricating compound or composition, and gives it a more homogeneous nature. Experiment has disclosed that zinc and the cylinder oil act as reducing agents upon the sulphur and eliminates the possibility of the sulphur corroding such surfaces as may be treated by the lubricating compound or composition at temperatures up to 450 degrees Fahrenheit. Where my improved lubricating compound or composition is to be used in internal combustion engines or in other machines where it will be subjected to extremely high temperatures, the sulphur may be omitted from the composition or compound without materially altering its effectiveness.

Sixthly—I employ valve or lubricating oil or cylinder oil, which acts both as a vehicle for the other constituents of the lubricating compound or composition and as a lubricant in its own right. The life of the cylinder oil is materially increased by its association with the above mentioned constituents.

As one preferred embodiment of my invention I set out below the following formula which has been found by experiment to produce the best or a preferred lubricating compound or composition for the efficient lubrication of the steam cylinders and pistons of a steam locomotive:—

3½ pounds of powdered white lead.
1 pound of sulphur.
1 pound flake graphite.
3 ounces ammonia (ammonium hydroxide).
3 ounces of powdered zinc.
1 gallon of valve or cylinder oil.

The first five constituents are thoroughly mixed in the valve or lubricating oil and a small amount of the compound or composition is introduced into the steam chest of the locomotive, preferably through the relief valve.

It is obvious that the lubricating compound or composition admits of variations in the elements and ingredients thereof when it is to be employed for purposes other than that of lubricating the piston and cylinder walls of steam locomotives, and it should also be noted that different mixtures and proportions of the above constituents may in certain instances be successfully employed. The sulphur is not regarded as an absolutely essential element in all instances.

What is claimed as new is:—

1. A lubricant of the type described composed principally of lubricating oil, flake graphite, powdered zinc, powdered white lead and ammonia.

2. A lubricant of the type described comprising lubricating oil, flake graphite, powdered metallic zinc, powdered white lead, ammonia, and sulphur.

3. A lubricant of the type described composed of lubricating oil, flake graphite, powdered metallic zinc, powdered white lead, ammonia, sulphur, in substantially the following proportions:—

3½ pounds of powdered white lead.
1 pound of sulphur.
1 pound of flake graphite.
3 ounces of ammonia.
3 ounces of powdered zinc and one gallon of lubricating oil.

In testimony whereof, I affix my signature.
ROBERT L. NEWBERN.